United States Patent [19]

Hutchison et al.

[11] Patent Number: 5,774,982
[45] Date of Patent: Jul. 7, 1998

[54] CONDUIT ATTACHMENT TO RECEIVER/DRIER OR ACCUMULATOR

[75] Inventors: Wayne K. Hutchison, Ingersoll; William N. Eybergen, Dutton, both of Canada

[73] Assignee: Eaton Corporation, Cleveland, Ohio

[21] Appl. No.: 214,337

[22] Filed: Mar. 16, 1994

[51] Int. Cl.$^6$ ............................ B15P 23/00; F25B 43/00
[52] U.S. Cl. ....................... 29/890.06; 29/513; 403/274; 62/509; 285/233; 285/382
[58] Field of Search ................ 92/890.06, 509, 92/513; 62/509, 503; 285/382, 233; 403/279, 274

[56] References Cited

U.S. PATENT DOCUMENTS

| | | | |
|---|---|---|---|
| 1,726,805 | 9/1929 | Carrey | 62/474 |
| 2,539,186 | 1/1951 | French | 403/279 |
| 4,029,426 | 6/1977 | Sims, Jr. | 29/509 |
| 4,331,001 | 5/1982 | Jones | 62/503 |
| 4,450,618 | 5/1984 | Ridenour | 29/509 |
| 4,707,999 | 11/1987 | Ohta et al. | 62/509 |
| 4,778,203 | 10/1988 | Bartholomew | 285/921 |
| 4,881,595 | 11/1989 | Damsohn et al. | 403/274 |
| 4,920,766 | 5/1990 | Yamamoto et al. | 62/509 |
| 5,038,582 | 8/1991 | Takamatsu | 62/474 |
| 5,064,223 | 11/1991 | Gross | 285/382 |
| 5,096,235 | 3/1992 | Oetiker | 285/921 |
| 5,191,775 | 3/1993 | Shiina et al. | 62/503 |
| 5,289,697 | 3/1994 | Hutchison | 62/474 |
| 5,314,214 | 5/1994 | Highlen et al. | 285/233 |
| 5,338,071 | 8/1994 | Hohmann et al. | 285/233 |
| 5,340,166 | 8/1994 | Puttonen et al. | 285/382 |

FOREIGN PATENT DOCUMENTS

| | | | |
|---|---|---|---|
| 2388636 | 12/1978 | France | 403/274 |
| 2037203 | 7/1980 | United Kingdom | 403/274 |

*Primary Examiner*—Larry I. Schwartz
*Assistant Examiner*—Marc W. Butler
*Attorney, Agent, or Firm*—Roger A. Johnston

[57] ABSTRACT

A method of attaching and sealing a fluid conduit to a refrigerant receiver drier of the type formed of an aluminum canister with a welded header in which is formed the inlet and outlet ports. An annular rib is formed in the header about the inlet port. An annular convolution is formed about the conduit to be attached adjacent the end and a resilient seal ring assembled over the tube conduit end and registers against the face or side of the convolution. The end of the tube conduit is then inserted in the port and the annular rib deformed over the convolution to retain the tube conduit in the port and sealed against the seal ring.

4 Claims, 1 Drawing Sheet

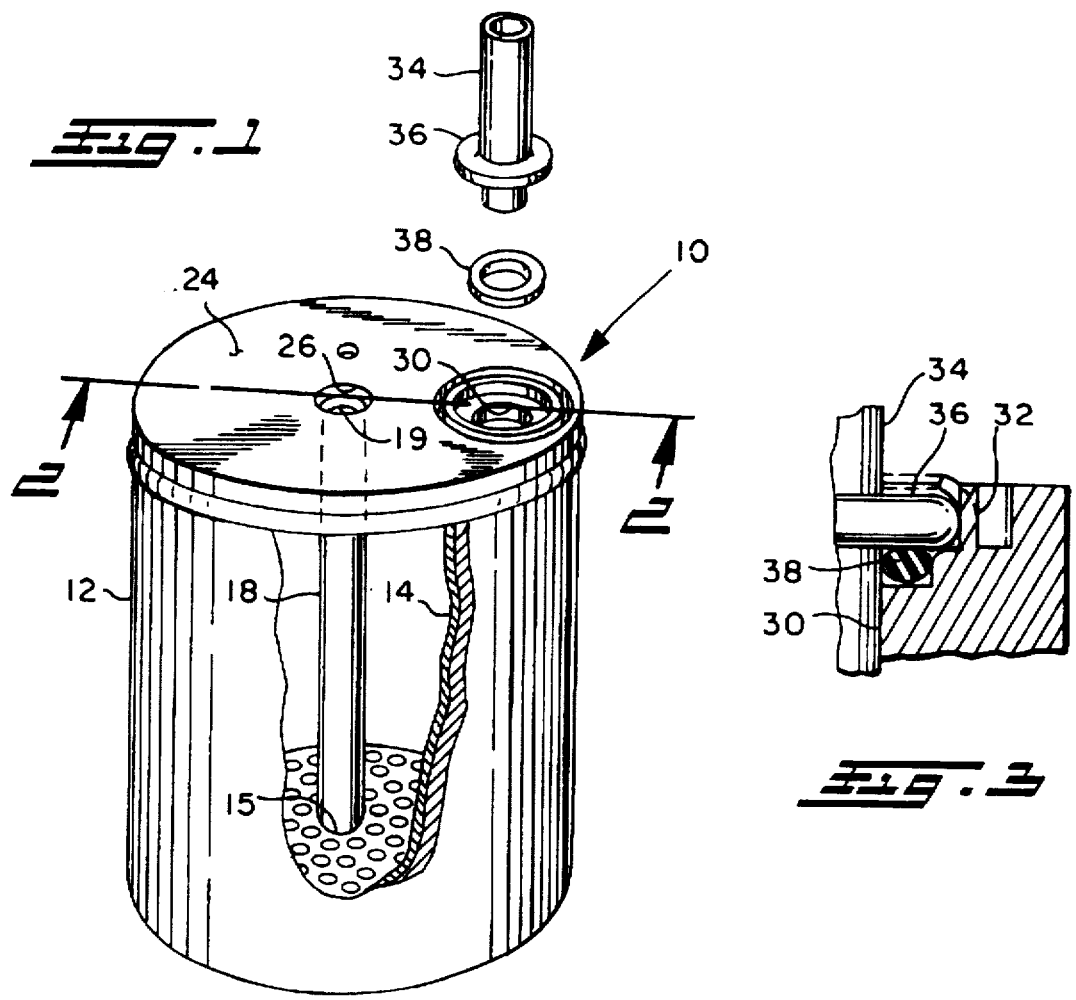
*Fig. 1*
*Fig. 3*
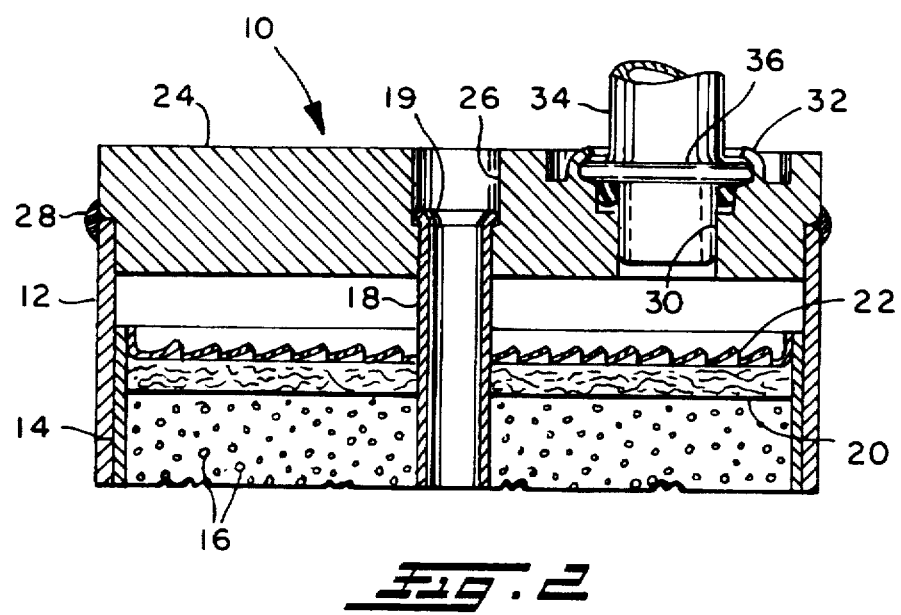
*Fig. 2*

CONDUIT ATTACHMENT TO RECEIVER/ DRIER OR ACCUMULATOR

BACKGROUND OF THE INVENTION

The present invention relates to attachment of fluid conduits to receivers or desiccant receptacles in pressurized fluid systems and particularly such devices as receiver/driers and accumulators employed in refrigeration systems such as those utilized in vehicle air conditioning. In refrigeration systems it is common practice to provide a canister type accumulator for trapping liquid to prevent liquid entry in the compressor inlet and consequent damage to the compressor. It is also common practice to provide a canister containing desiccant to remove moisture from the refrigerant prior to expansion and flow through the system evaporator. Receiver/driers and accumulators for vehicle air conditioning systems are required to seal relatively high pressures on the order of 350 psi (24 kPa); and, it has proven difficult to provide for quick connect assembly of tubing and conduits to such devices in mass production in a manner which provides a reliable seal over the service life of the vehicle.

Heretofore, vehicle air conditioning receiver/driers and accumulators have employed attachment blocks secured to the end of the metal conduit by weldment, with the block attached to the header or end of the receiver/drier or accumulator by an attachment bolt or screw threaded into the header. Tightening of the bolt or screw has provided clamping forces which compress a seal ring and seal the end of the tube and block junction to the port in the receiver/drier or accumulator. This type of conduit attachment employing a block welded to the end of the conduit or tube to be attached has proven to be quite costly due to the cost of the block and the setup and processing for welding the block to the tube. Furthermore, this has created problems in orienting the tube and block welded thereto with respect to the threaded hole in the receiver/drier or accumulator for receiving the attachment bolt or screw. Where the conduit is preformed with bends this has proven to be a difficult dimensional control situation during the weldment; and, has also created problems of alignment during installation in the vehicle.

Thus it has been desired to find a simple, low cost way or means of attaching a pressurized fluid conduit in sealing engagement to a receptacle such as a refrigerant receiver/ drier or accumulator in a manner which is accommodating to problems of orientation and alignment and yet provides a secure attachment and reliable high pressure seal.

SUMMARY OF THE INVENTION

The present invention provides a low cost and simplified technique for attaching a fluid pressure conduit to a receptacle such as a receiver/drier or accumulator employed in a refrigeration system such as used in vehicle air conditioning.

The fluid conduit connection of the present invention employs an annular convolution formed on the end of the conduit-to-be-attached with a seal ring received over the end of the conduit which is inserted in a fluid port provided in the receptacle such as header of the receiver/drier or accumulator. An annular rib is formed about a port in the receptacle; and, in receiver/drier or accumulator applications, the port and rib are formed in the header. The annular rib is deformed over the annular convolution of the conduit to be attached which retains the conduit in the fluid port and compresses the seal ring to thereby effect a secure attachment for the conduit and a reliable fluid pressure seal between the conduit and the fluid port to which the conduit is to be attached.

BRIEF DESCRIPTION OF THE DRAWINGS

FIG. 1 is an exploded view of the conduit connection of the present invention;

FIG. 2 is a portion of a section view taken along section indicating lines 2—2 of FIG. 1; and, FIG. 3 is an enlarged view of a portion of FIG. 2.

DETAILED DESCRIPTION

Referring to FIGS. 1 and 2, the assembly of the conduit to the pressurized vessel of the present invention is indicated generally at 10 and comprises a canister 12 which is preferably formed of aluminum material in the present practice the invention and is preferably formed by a deep drawing process with the lower end thereof closed and the upper end thereof open. The invention is illustrated in FIG. 2 as embodied in a receiver/drier for a vehicle air conditioning system wherein a basket 14 is disposed in the canister 12 with the outer diameter of the basket closely interfitting the inner surface of the canister. The basket is filled with desiccant material 16 typically in granular form; and, an outlet port tube 18 passes vertically through the center of the basket through an aperture 15 shown in the bottom of the basket. The upper end of the basket is illustrated as covered with a layer of filter material such as fibrous wool material indicated at 20. The filter material 20 is covered by a perforated cover 22 which permits passage of refrigerant fluid therethrough. It will be understood that the lower end of the basket is similarly filtered and perforated although not illustrated.

The upper end of the outlet port tube 18 is attached to a header 24 at an outlet port 26 formed therein; and, the header is received over, secured and sealed over the upper end of the canister 12 by weldment 28.

The header, which it is understood is also preferably formed of aluminum material, has an inlet port 30 spaced from the outlet port and extending through the header. It will be understood that the outlet tube 18 is inserted in the outlet port 26 and secured therein by a suitable expedient as for example flaring the end of the tube as denoted by reference numeral 19.

Referring to FIGS. 2 and 3, the header 24 has an annular rib 32 formed about the inlet port 30 preferably by removal of material which is shown in its as-fabricated form in solid outline in FIG. 3 and in its assembled form in solid outline in FIG. 2.

A tubular conduit 34 has an annular convolution or bulge 36 formed thereabout adjacent one end thereof and preferably said one end reduced in diameter; and, a resilient seal ring 38 is received over the end of the tubular conduit 34 and registers against the axial face of the convolution 36. The end of the tubular conduit 34 is then inserted in the inlet port 30 with the seal ring 38 disposed about the port 30; and, the rib 32 in the header 24 is deformed radially inwardly over the periphery of the convolution 36 to retain the inlet tube securely in the inlet port and sealed by seal ring 38. In the presently preferred practice, it has been found satisfactory to deform selected circumferential portions of the rib 32

The present invention thus provides a simple and relatively low cost technique for attaching a tubular conduit to a pressurized fluid vessel and has particular application for connecting fluid pressure lines to receiver/driers or accumulators of the type employed in refrigeration systems for automotive air conditioning.

Although the invention has hereinabove been described with respect to the illustrated embodiments, it will be understood that the invention is limited only by the following claims.

We claim:

1. A method of making a receiver/drier or accumulator for a refrigerant system comprising:

(a) forming a canister having one open end;

(b) providing a header with an inlet fluid port therethrough and welding the header about the open end of the canister;

(c) forming an annular rib about said fluid port in said header;

(d) providing a tubular conduit and forming an annular bulge adjacent one end thereof;

(e) disposing a sealing ring about said inlet fluid port;

(f) inserting the end of said tubular conduit in said sealing ring and said fluid port and deforming said rib over said annular bulge and retaining and sealing said tubular conduit in said fluid port;

(g) forming an outlet fluid port in the header and inserting an outlet tube in said outlet fluid port and deforming said outlet tube for retention therein.

2. The method defined in claim 1, wherein said step of forming an annular bulge includes reducing the diameter of said one end of said tubular conduit.

3. The method defined in claim I wherein the step of deforming said outlet tube includes flaring.

4. A method of making a receiver/drier or accumulator for a refrigerant system comprising:

(a) forming a canister having one open end;

(b) providing a header and forming, a first fluid port therethrough and securing and sealing said header about the open end of the canister by weldment;

(c) removing material about said port and forming an annular rib thereabout;

(d) providing a tubular conduit and forming an annular bulge adjacent one end thereof;

(e) disposing a sealing ring over said one end of said tube and inserting said one end of said tube in said port; and, deforming said annular rib over said annular bulge and retaining and sealing said tubular conduit in said port; and, (f) forming a second fluid port in said header and inserting a tube therein and deforming one end of said tubular conduit for retention therein.

\* \* \* \* \*